US011226866B2

(12) United States Patent
Iwasaki et al.

(10) Patent No.: US 11,226,866 B2
(45) Date of Patent: *Jan. 18, 2022

(54) POLICY DRIVEN DATA UPDATES

(71) Applicant: International Business Machines Corporation, Armonk, NY (US)

(72) Inventors: Norie Iwasaki, Fujisawa (JP); Sosuke Matsui, Yokohama (JP); Tsuyoshi Miyamura, Yokohama (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 287 days.

This patent is subject to a terminal disclaimer.

(21) Appl. No.: 16/513,761

(22) Filed: Jul. 17, 2019

(65) Prior Publication Data
US 2019/0340079 A1 Nov. 7, 2019

Related U.S. Application Data

(63) Continuation of application No. 14/860,741, filed on Sep. 22, 2015, now Pat. No. 10,394,661.

(51) Int. Cl.
*G06F 16/00* (2019.01)
*G06F 11/14* (2006.01)
*G06F 16/11* (2019.01)

(52) U.S. Cl.
CPC ...... *G06F 11/1458* (2013.01); *G06F 11/1451* (2013.01); *G06F 16/128* (2019.01); *G06F 2201/84* (2013.01)

(58) Field of Classification Search
CPC ............... G06F 2201/84; G06F 16/128; G06F 11/1451; G06F 11/1458
See application file for complete search history.

(56) References Cited

U.S. PATENT DOCUMENTS

| 7,395,378 | B1 | 7/2008 | Pendharker et al. |
| 7,509,316 | B2 * | 3/2009 | Greenblatt .............. G06F 16/10 |
| 7,509,468 | B1 | 3/2009 | Dalal et al. |
| 7,636,736 | B1 | 12/2009 | Kumar et al. |
| 7,653,669 | B2 | 1/2010 | Kapoor et al. |
| 7,702,662 | B2 | 4/2010 | Adkins et al. |

(Continued)

OTHER PUBLICATIONS

Coyne et al., "IBM Linear Tape File System Enterprise Edition V1.1.1.2 Installation and Configuration Guide", International Technical Support Organization, Third Edition (Jan. 2015), IBM Redbooks, Chapter 7, Operations, pp. 1-23, © Copyright IBM Corp. 2013, 2015.

(Continued)

*Primary Examiner* — Shiow-Jy Fan
(74) *Attorney, Agent, or Firm* — Edward J. Wixted, III

(57) ABSTRACT

A method, executed by at least one processor, includes generating a snapshot for a plurality of data files, receiving an update request for a selected file of the plurality of data files, determining if the selected file is subject to a backup policy, updating the selected file without preserving the snapshot of the selected file if the selected file is not subject to the backup policy, and updating the selected file while preserving the snapshot of the selected file if the selected file is subject to the backup policy. A corresponding computer program product and computer system are also disclosed herein.

16 Claims, 5 Drawing Sheets

DISKS BLOCKS REFERRED TO BY FILE 1 AND FILE 2

(56) References Cited

U.S. PATENT DOCUMENTS

| | | |
|---|---|---|
| 7,774,313 B1 | 8/2010 | Nachenberg |
| 8,176,272 B2 | 5/2012 | Augenstein et al. |
| 8,473,463 B1 | 6/2013 | Wilk |
| 8,762,341 B1 | 6/2014 | Mahajan et al. |
| 9,633,051 B1 | 4/2017 | Maccanti et al. |
| 2003/0101321 A1 | 5/2003 | Ohran |
| 2003/0158861 A1 | 8/2003 | Sawdon et al. |
| 2003/0159007 A1 | 8/2003 | Sawdon et al. |
| 2005/0027956 A1* | 2/2005 | Tormasov ............ G06F 11/1451 711/162 |
| 2005/0033757 A1 | 2/2005 | Greenblatt et al. |
| 2005/0050110 A1 | 3/2005 | Sawdon et al. |
| 2005/0203908 A1 | 9/2005 | Lam et al. |
| 2005/0273476 A1* | 12/2005 | Wertheimer ........ G06F 11/1458 |
| 2006/0190505 A1 | 8/2006 | DeMaio et al. |
| 2007/0198797 A1 | 8/2007 | Kavuri et al. |
| 2007/0283017 A1* | 12/2007 | Anand ................ G06F 11/1458 709/226 |
| 2008/0133622 A1 | 6/2008 | Brown et al. |
| 2008/0307527 A1 | 12/2008 | Kaczmarski et al. |
| 2012/0179655 A1 | 7/2012 | Beatty et al. |
| 2012/0203742 A1 | 8/2012 | Goodman et al. |
| 2015/0052320 A1 | 2/2015 | Peretz et al. |
| 2015/0081994 A1 | 3/2015 | Christopher et al. |
| 2017/0083409 A1 | 3/2017 | Iwasaki et al. |

OTHER PUBLICATIONS

Shim et al., "Characterization of Incremental Data Changes for Efficient Data Protection", USENIX Association, 2013 USENIX Annual Technical Conference (USENIX ATC '13), pp. 157-168.

Xiao et al., "Implementation and Performance Evaluation of Two Snapshot Methods on iSCSI Target Storages", Proceedings 14th NASA Goddard/23rd IEEE Conference Mass Storage Systems and Technologies (MSST '06) pp. 1-11.

"Preserving point-in-time objectives in block level incremental snapshot systems—by cascading snapshots", Authors et al.: Disclosed Anonymously, IP.com No. 000200576, IP.com Electronic Publication: Oct. 19, 2010, pp. 1-4, <http://null/IPCOM/000200576>.

IBM, "List of Patent Applications Treated as Related", Appendix P, 2 pages, Filed Herewith.

* cited by examiner

DISKS BLOCKS REFERRED TO BY FILE 1 AND FILE 2

POLICY DRIVEN DATA UPDATES

BACKGROUND OF THE INVENTION

The present invention relates generally to storing data and specifically to providing data backups of stored data.

Snapshots are sometimes used for file system backups and the like. When a backup is performed, first a snapshot is created, and a baseline of the file system is acquired. Next, out of the files included in the snapshot, a list of the files to be backed up is generated. For example, when files owned by a certain user are backed up, a list of the user's files may be generated. Similarly, a differential and incremental backup may include generating a list of the files created or updated after the previous backup. An application for backup (and the like) may copy the files identified in the list to a backup medium and delete the snapshot when all the files to be backed up have been copied.

SUMMARY

A method, executed by at least one processor, includes generating a snapshot for a plurality of data files, receiving an update request for a selected file of the plurality of data files, determining if the selected file is subject to a backup policy, updating the selected file without preserving the snapshot of the selected file if the selected file is not subject to the backup policy, and updating the selected file while preserving the snapshot of the selected file if the selected file is subject to the backup policy. A corresponding computer program product and computer system are also disclosed herein.

DETAILED DESCRIPTION

The embodiments disclosed herein reduce the required storage space and improve the performance of data backups that are subject to a policy including virus scans, asynchronous replication operations, and user specified data backups.

As mentioned in the background section, snapshots are sometimes used for file system backups and the like. However, backup operations are often subject to a policy which specifies the file(s), or other unit(s) of storage, for which the backup is desired. The embodiments disclosed herein recognize that only a subset of the files may be subject to the backup policy and leverage that recognition to improve data update operations associated with file systems and the like.

Figure 1:
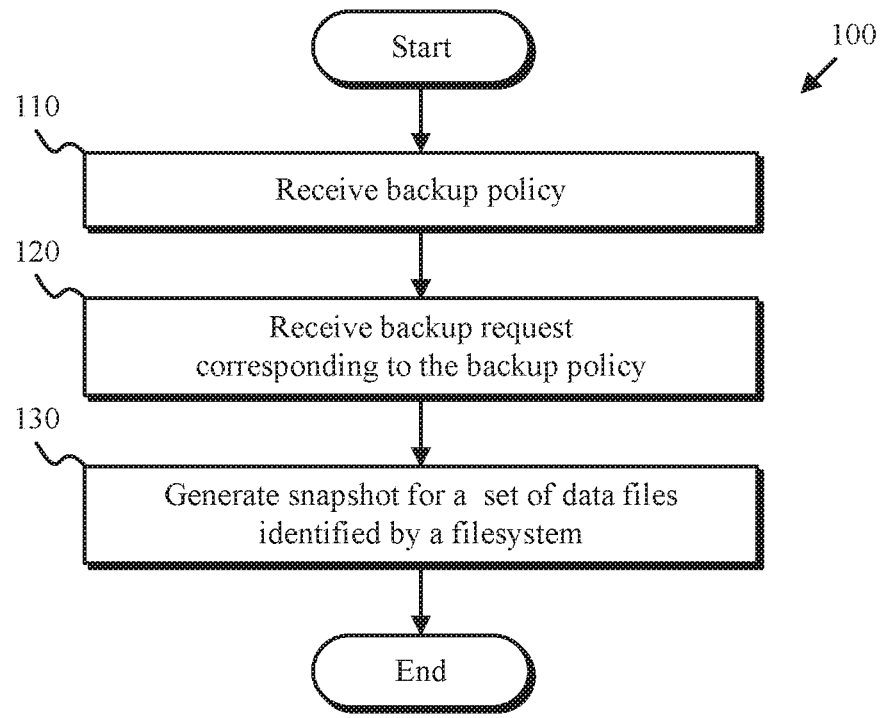
FIG. 1 is flowchart depicting one example of a snapshot generation method in accordance with at least one embodiment of the claimed invention.

Various embodiments of the present invention with now be described with reference to the Figures. FIG. 1 is flowchart depicting one example of a snapshot generation method 100 in accordance with at least one embodiment of the claimed invention. As depicted, the snapshot generation method 100 includes receiving (110) a backup policy, receiving (120) a backup request, and generating (130) a snapshot. The backup generation method 100 may be conducted to provide a foundation for the data update method 200 shown in FIG. 2, or a similar method.

Receiving (110) a backup policy may include receiving a policy that specifies which files in a filesystem, or the like, are to be backed up. The policy may also specify a location for the backed up files and one or more times and dates for the backup.

Receiving (120) a backup request may include receiving a request to conduct a backup that corresponds to the backup policy. Generating (130) a snapshot may include conducting a snapshot operation on the filesystem, or a portion thereof, that facilitates maintaining a backup that conforms to the backup policy. For example, the snapshot may be used to ensure that the backup conforms to a particular time and date indicated by the backup policy.

Figure 2:
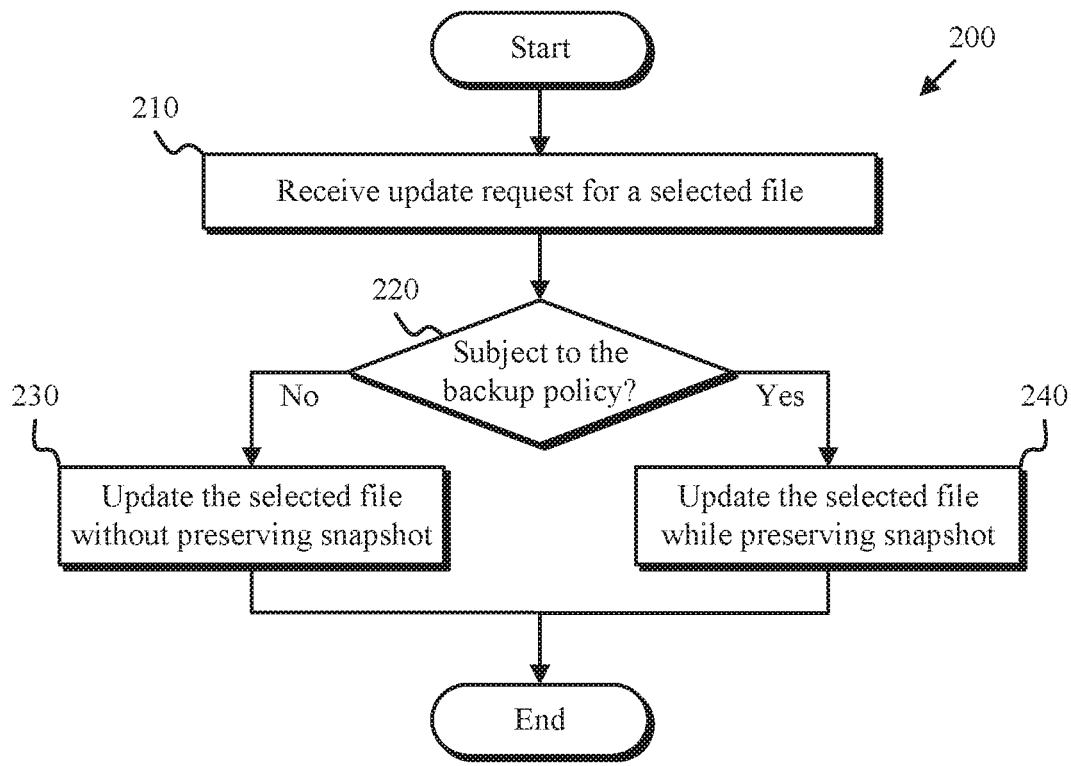
FIG. 2 is flowchart depicting one example of a data update method in accordance with at least one embodiment of the claimed invention.

FIG. 2 is flowchart depicting one example of a data update method in accordance with at least one embodiment of the claimed invention. As depicted, the data update method 200 includes receiving (210) an update request for a selected file, determining (220) whether the requested update is subject to a backup policy, and updating (230) or updating (240) the selected file. The data update method 200 may be conducted on files for which a snapshot already exists. For example, the backup generation method 100 may be conducted on an entire filesystem, or a portion thereof (e.g., a volume), to provide a snapshot to which the data update method 200 may be applied.

Receiving (210) an update request for a selected file may include receiving an update request that specifies the file that is to be updated along with data and/or operations that are to be performed on the selected file. Determining (220) whether the requested update is subject to a backup policy may include evaluating a policy to determine if the selected file matches the requirements of the backup policy.

Updating (230) the selected file may include updating the selected file without preserving the snapshot of the selected file. For example, the selected file, or a portion thereof, may be overwritten at its current location to conform to the requested update. Updating (240) the selected file may include preserving the snapshot corresponding to the backup date and time. For example, a copy-on-write procedure may be conducted to copy the old data to a new location while updating the selected file or portions thereof at the current location. For example, in some embodiments the new location is on a different volume such as a backup volume. Alternately, a redirect-on-write procedure may be conducted and the new data may be written to a new location and the filesystem may be updated to reflect the changed location for the selected file or a portion thereof.

Figure 3:
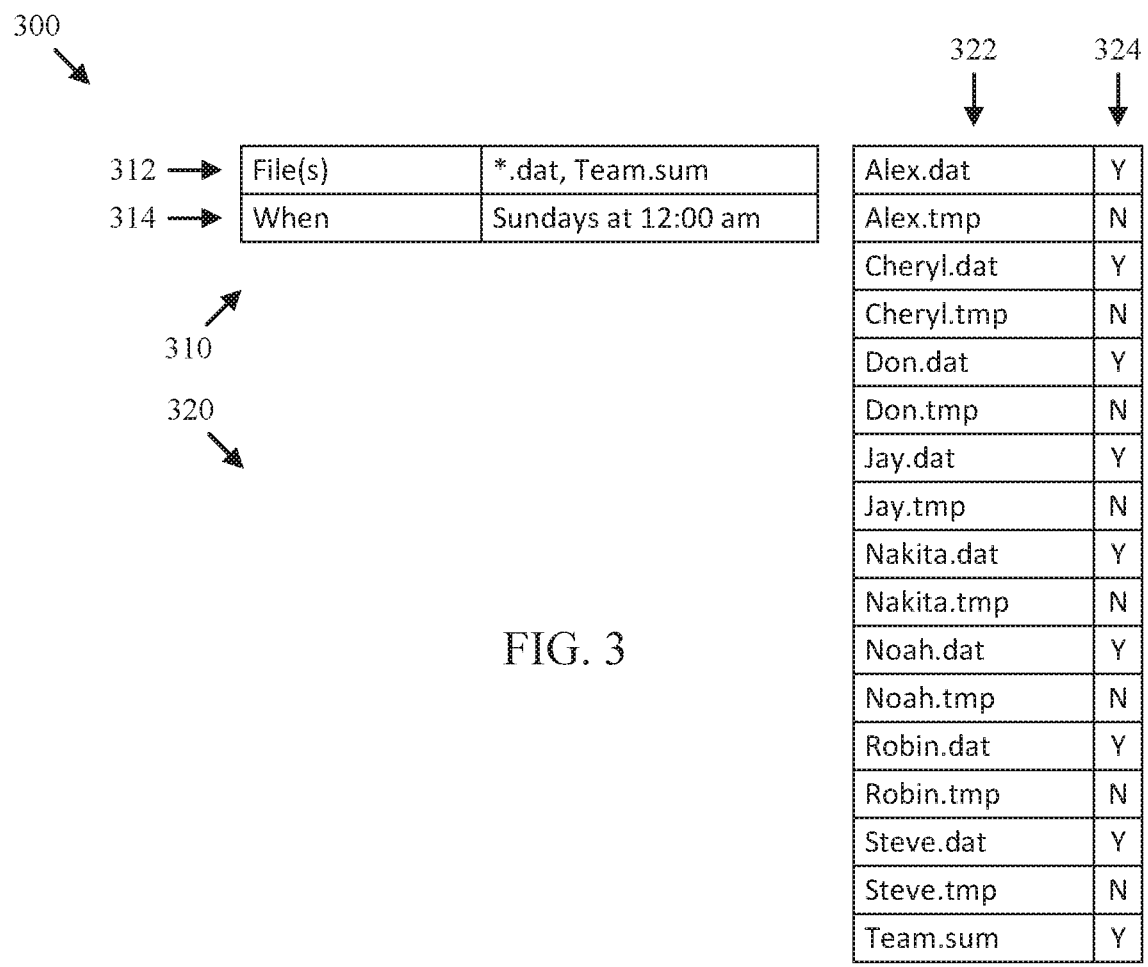
FIG. 3 is a set of tables depicting one example of policy evaluation results in accordance with at least one embodiment of the claimed invention.

FIG. 3 is a set of tables 300 depicting one example of policy evaluation results 320 in accordance with at least one embodiment of the claimed invention. The depicted policy evaluation results 320 include a filename 322 and a backup indicator 324. The policy evaluation results 320 may correspond to a particular policy 310. The depicted policy 310 includes a file specification 312 and a time specification 314. The depicted file specification 312 includes the filename filters "*.dat" and "Team.sum". As shown in the policy evaluation results 320, any filename 322 which conforms to the file specification 312 has a positive evaluation result indicated by a 'Y' in the results table 320. Conversely, any filename 322 which does not conform to the file specification 312 has a negative evaluation result indicated by an 'N' in the results table 320.

In some embodiments, the policy evaluation results are immediately generated in response to conducting a snapshot of a filesystem or a portion thereof. In other embodiments, the policy evaluation results are generated when needed (e.g., in response to file update requests). In either case, the policy evaluation results may be retained for subsequent use.

In addition to evaluating a policy for update operations, file delete operations may also benefit from policy evaluation. For example, if a file is subject to a backup policy the corresponding snapshot file and data blocks may be retained as the backup data and not deleted. If the file is not subject to a backup policy the file may be deleted and the data blocks corresponding to the deleted file may be recycled for subsequent use.

Figure 4A:
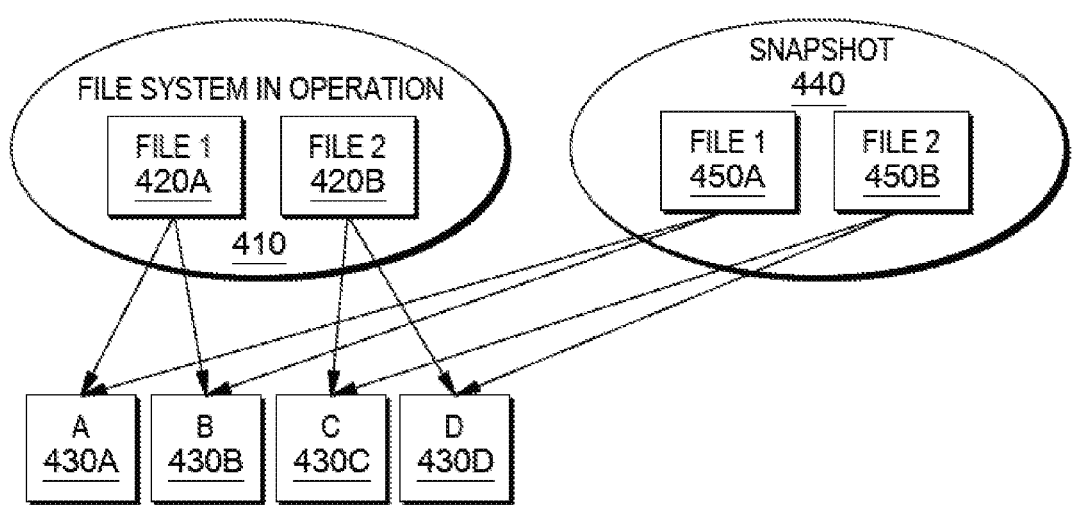
FIGS. 4A-4C are schematic diagrams depicting the effect of the method of FIG. 2 on two update scenarios in accordance with at least one embodiment of the claimed invention.
Figure 4B:
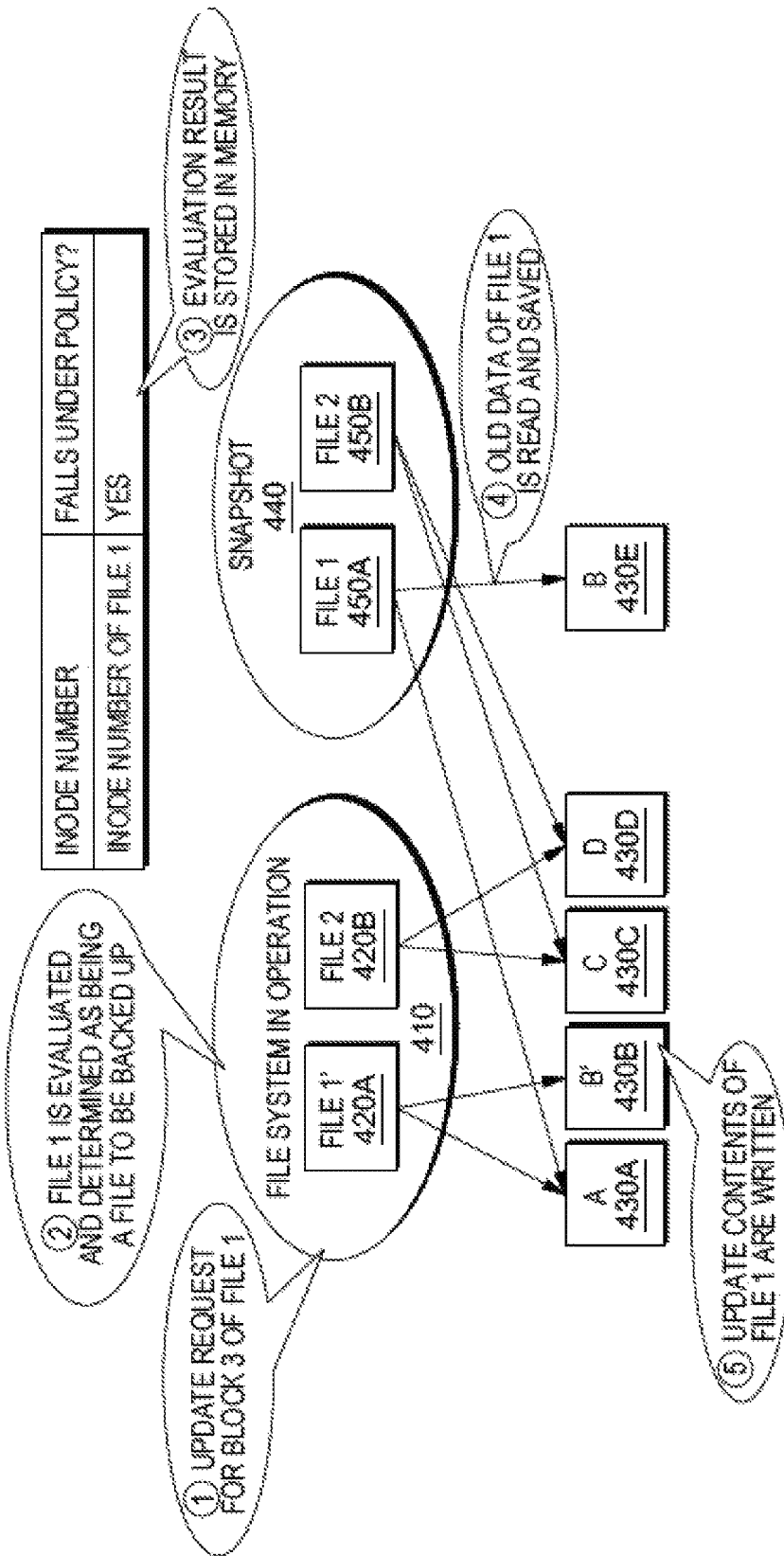
Figure 4C:
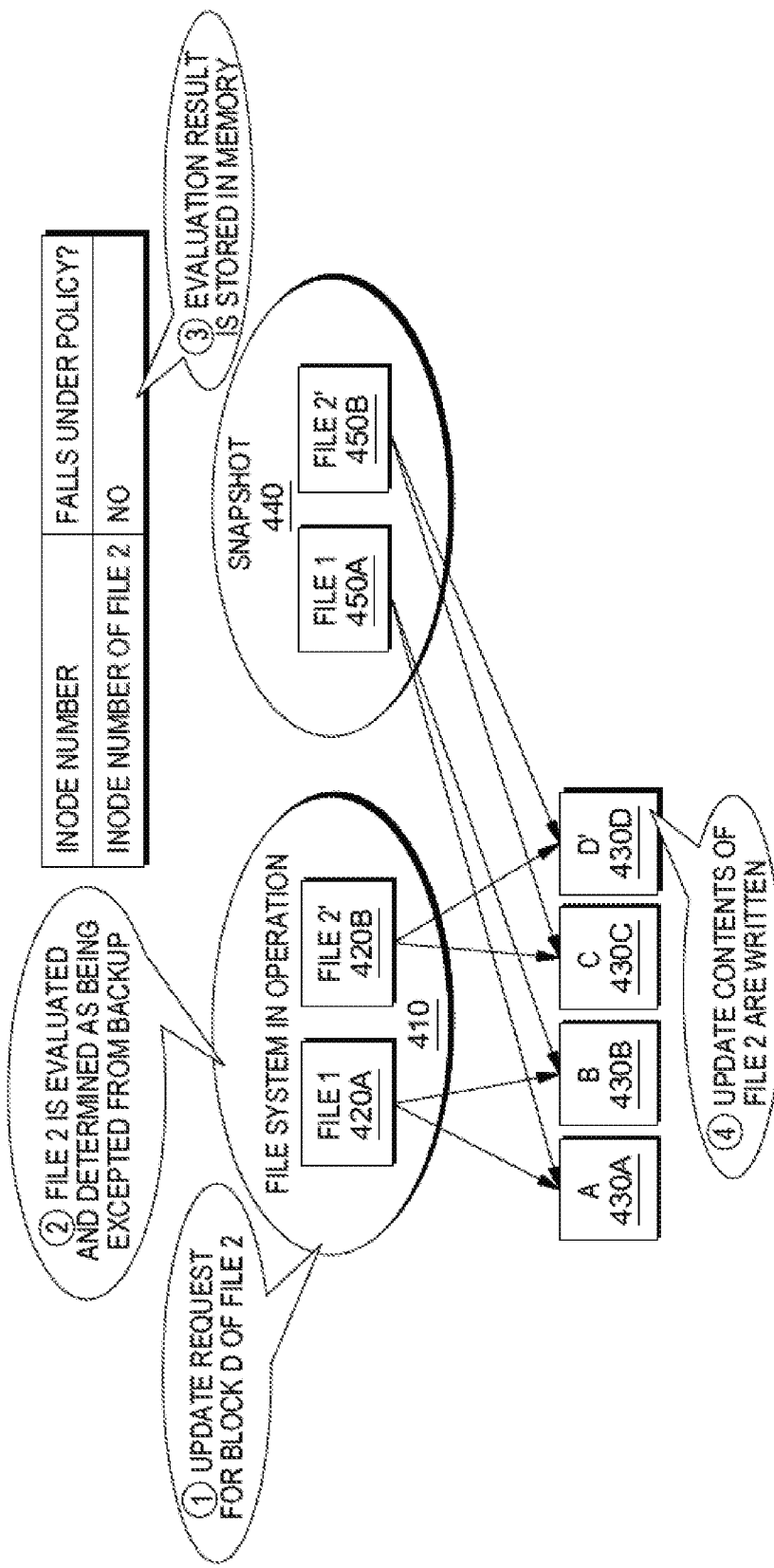

FIGS. 4A-4C are schematic diagrams depicting the effect of the method of FIG. 2 on two update scenarios in accordance with at least one embodiment of the claimed invention. FIG. 4A shows file system 410 with files 420 (i.e., 420A and 420B) comprised of one or more data blocks 430. In the depicted example, file 420A is comprised of (i.e., references) data blocks 430A and 430B, while file 420B references data blocks 430C and 430D. A snapshot 440 of filesystem 410 includes snapshot files 450A and 450B that correspond to files 420A and 420B when the snapshot is taken. Consequently, snapshot files 450A and 450B reference the same data blocks (i.e., 430A-D) as files 420A and 420B immediately after the snapshot is taken. The snapshot 440 may serve as a baseline for backup operations.

FIG. 4B shows the effect of an update request for file 420A when file 420A is subject to an update request. Evaluation of the appropriate backup policy indicates that file 420A is subject to a backup. Consequently, in the depicted (copy-on-write) embodiment data block 430B is copied to data block 430E and then updated with the new data indicated in the update request. Snapshot file 450A is also updated to reference data block 430E instead of 430B. In another (redirect-on-write) embodiment, the new data is written to a new block (e.g., data block 420E), file 420A is updated to reference the new block (e.g., data block 420E) while snapshot 450A continues to reference data block 430B.

FIG. 4C shows the effect of an update request for file 420B when file 420B is subject to an update request. Evaluation of the appropriate backup policy indicates that file 420B is not subject to a backup. Consequently, data block 430D is updated with the new data indicated in the update request. File 420B and snapshot file 450B continue to refer to data block 430D. Consequently, the original snapshot of file 420B, namely snapshot file 450B, is overwritten and is not preserved. Although snapshot 440 may no longer represent a specific point-in-time snapshot of the entire filesystem, the snapshot 440 maintains proper integrity for the files that are subject to the backup policy. In some embodiments, at a selected point in time, an application for backup (and the like) may copy the files that remain in the snapshot 440 to a backup medium and delete the snapshot when all the files within the snapshot 440 have been copied.

One advantage of the embodiments disclosed herein that one of skill in the art may appreciate, is that the overhead of a copy-on-write operation or a redirect-on-write operation is avoided for files that are not subject to the backup policy. For example, with one tested scenario with a conventional snapshot, the magnitude of delay in a file update process is ~100%. In contrast, by saving only the data needed for backup (e.g., by using a policy driven approach) the overhead is reduced to ~20%.

One of skill in the art will also appreciate that when files other than those to be backed up are updated, storage area consumption by the snapshot can be reduced compared to when a conventional snapshot is used. For example, in the above mentioned tested scenario a conventional snapshot consumed ~8% of the storage area for an incremental backup while a policy driven approach consumed only 2% of the storage area for an incremental backup.

Figure 5:
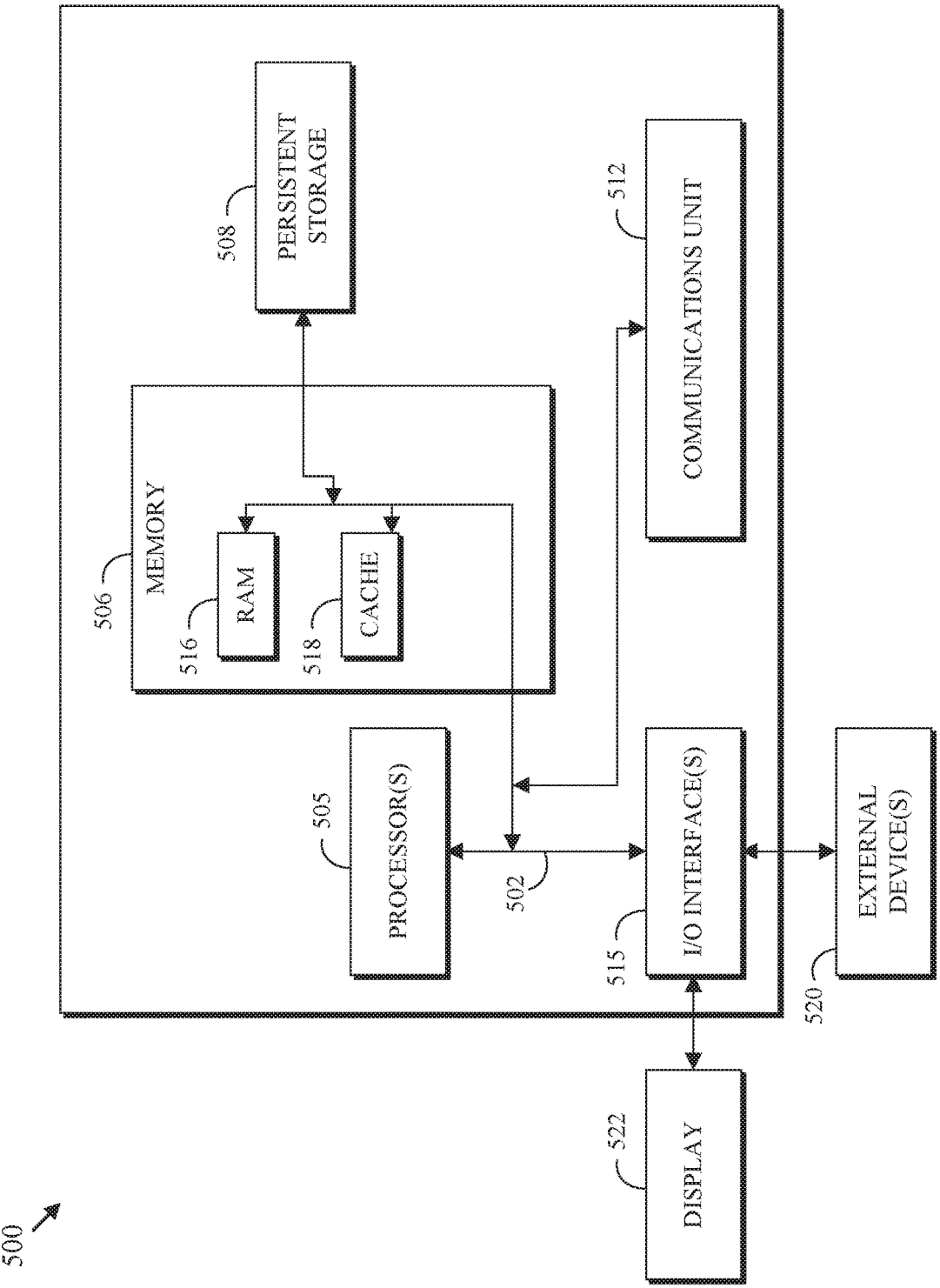
FIG. 5 is a block diagram depicting one example of a computing apparatus (e.g., computer) suitable for executing the methods disclosed herein.

FIG. 5 is a block diagram depicting one example of a computing apparatus (e.g., computer) suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

One of skill in the art will appreciate that the above disclosed embodiments may be adapted for a variety of environments and applications. Furthermore, the programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computer-implemented method comprising:
   generating a snapshot for a plurality of data files, wherein:
      a first data file references a first data block and a second data file references a second data block; and
      the snapshot includes a first snapshot file that references the first data block and a second snapshot file that references the second data block;
   receiving a first request to update the first data block for the first data file;
   determining the first data file is subject to a backup policy;
   responsive to determining that the first data file is subject to the backup policy:
      copying the first data block to a third data block; and
      updating the first data block, wherein:
         subsequent to the first request, the first data file references the updated first data block and the first snapshot file references the third data block; and
         the third data block includes data from the first data block from before the update;
   receiving a second request to update the second data block for the second data file;
   determining that the second data file is not subject to the backup policy; and
   responsive to determining that the second data file is not subject to the backup policy, updating the second data block, wherein subsequent to the second request, the second data file and the second snapshot file each reference the updated second data block.

2. The method of claim 1, wherein the plurality of data files correspond to at least one logical unit of storage.

3. The method of claim 1, wherein preserving a backup of the first data file comprises copying the first data file.

4. The method of claim 1, wherein determining the first data file is subject to the backup policy comprises evaluating the backup policy, wherein results of the backup policy evaluation are immediately generated in response to generating the snapshot for the plurality of data files, and wherein the results are retained for subsequent use.

5. The method of claim 1, wherein determining the first data file is subject to the backup policy comprises accessing a stored indicator corresponding to the selected file.

6. The method of claim 1, wherein the backup policy identifies data files that are to be backed up.

7. The method of claim 1, further comprising:
   generating a table for the results of the backup policy evaluation, wherein a positive evaluation result indicates the first data file conforms to the backup policy and a negative evaluation result indicates the first data file does not conform to the backup policy.

8. A computer program product comprising:
   one or more computer readable storage media and program instructions stored on the one or more computer readable storage media, the program instructions comprising instructions to:
   generate a snapshot for a plurality of data files, wherein:
      a first data file references a first data block and a second data file references a second data block; and
      the snapshot includes a first snapshot file that references the first data block and a second snapshot file that references the second data block;
   receive a first request to update the first data block for the first data file;
   determine the first data file is subject to a backup policy;
   responsive to determining that the first data file is subject to the backup policy:
      copy the first data block to a third data block; and
      update the first data block, wherein:
         subsequent to the first request, the first data file references the updated first data block and the first snapshot file references the third data block; and
         the third data block includes data from the first data block from before the update;
   receive a second request to update the second data block for the second data file;
   determine that the second data file is not subject to the backup policy; and
   responsive to determining that the second data file is not subject to the backup policy, updating the second data block, wherein subsequent to the second request, the second data file and the second snapshot file each reference the updated second data block.

9. The computer program product of claim 8, wherein the plurality of data files correspond to at least one logical unit of storage.

10. The computer program product of claim 8, wherein preserving a backup of the first data file comprises copying the first data file.

11. The computer program product of claim 8, wherein the instructions to determine if the first data file is subject to the backup policy comprise instructions to evaluate the backup policy, wherein results of the backup policy evaluation are immediately generated in response to generating the snapshot for the plurality of data files, and wherein the results are retained for subsequent use.

12. The computer program product of claim 8, wherein the instructions to determine if the first data file is subject to the backup policy comprise instructions to access a stored indicator corresponding to the first data file.

13. The computer program product of claim 8, wherein the backup policy identifies data files that are to be backed up.

14. A computer system comprising:
one or more computers;
one or more computer readable storage media and program instructions stored on the one or more computer readable storage media for execution by at least one of the computers, the program instructions comprising instructions to:
generate a snapshot for a plurality of data files, wherein:
a first data file references a first data block and a second data file references a second data block; and
the snapshot includes a first snapshot file that references the first data block and a second snapshot file that references the second data block;
receive a first request to update the first data block for the first data file;
determine the first data file is subject to a backup policy;
responsive to determining that the first data file is subject to the backup policy:
copy the first data block to a third data block; and
update the first data block, wherein:
subsequent to the first request, the first data file references the updated first data block and the first snapshot file references the third data block; and
the third data block includes data from the first data block from before the update;
receive a second request to update the second data block for the second data file;
determine that the second data file is not subject to the backup policy; and
responsive to determining that the second data file is not subject to the backup policy, updating the second data block, wherein subsequent to the second request, the second data file and the second snapshot file each reference the updated second data block.

15. The computer system of claim 14, wherein preserving a backup of the first data file comprises copying the first data file.

16. The computer system of claim 14, wherein the instructions to determine if the first data file is subject to the backup policy comprise instructions to evaluate the backup policy, wherein results of the backup policy evaluation are immediately generated in response to generating the snapshot for the plurality of data files, and wherein the results are retained for subsequent use.

* * * * *